No. 610,542. Patented Sept. 13, 1898.
F. P. KEESEE.
VENDING MACHINE.
(Application filed Dec. 9, 1897.)
(No Model.) 4 Sheets—Sheet 1.

Witnesses. Inventor.

No. 610,542. Patented Sept. 13, 1898.
F. P. KEESEE.
VENDING MACHINE.
(Application filed Dec. 9, 1897.)
(No Model.) 4 Sheets—Sheet 2.

Witnesses
Inventor.
Frank P. Keesee

No. 610,542. Patented Sept. 13, 1898.
F. P. KEESEE.
VENDING MACHINE.
(Application filed Dec. 9, 1897.)
(No Model.) 4 Sheets—Sheet 3.

Witnesses. W. J. McCrimmon
Ira McCrimmon

Inventor.
Frank P. Keesee

No. 610,542. Patented Sept. 13, 1898.
F. P. KEESEE.
VENDING MACHINE.
(Application filed Dec. 9, 1897.)
(No Model.) 4 Sheets—Sheet 4.
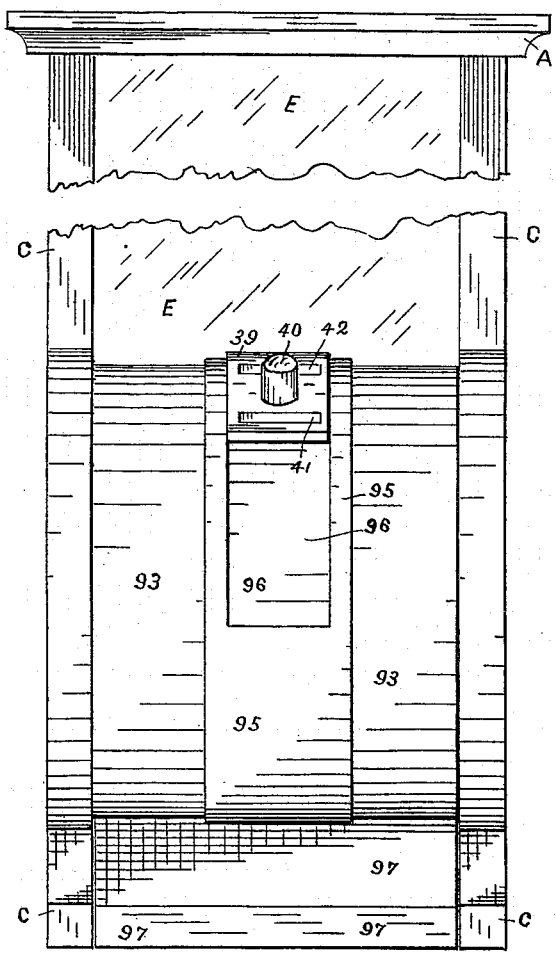
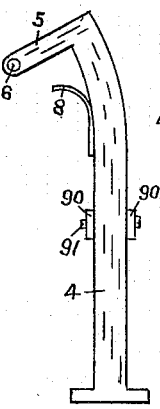
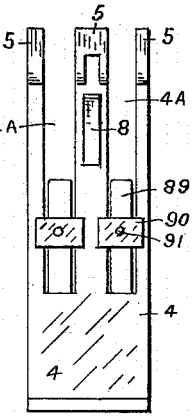
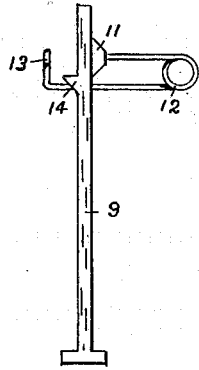
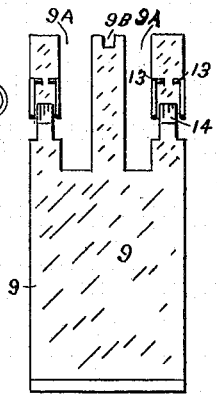
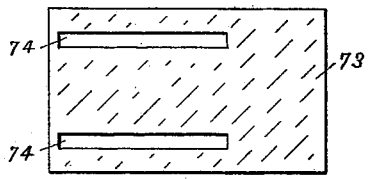
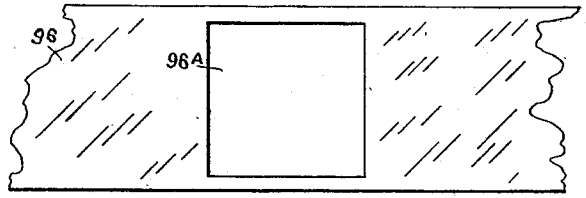

UNITED STATES PATENT OFFICE.

FRANK P. KEESEE, OF TORONTO, CANADA, ASSIGNOR OF ONE-HALF TO DUNCAN H. McDERMID, OF LONDON, CANADA.

VENDING-MACHINE.

SPECIFICATION forming part of Letters Patent No. 610,542, dated September 13, 1898.

Application filed December 9, 1897. Serial No. 661,318. (No model.) Patented in Canada August 5, 1896, No. 53,135.

*To all whom it may concern:*

Be it known that I, FRANK P. KEESEE, a citizen of the United States, residing at Toronto, Province of Ontario, in the Dominion of Canada, have invented a new and useful Vending-Machine, (for which I have obtained a patent in the Dominion of Canada, No. 53,135, bearing date August 5, 1896,) of which the following is a specification.

My invention relates to coin-operated vending-machines; and the objects of my invention are to provide a machine that will be easy to operate, difficult to rob, and a certainty in its action.

I attain these objects by the mechanism illustrated in the accompanying drawings, in which—

Figure 1:
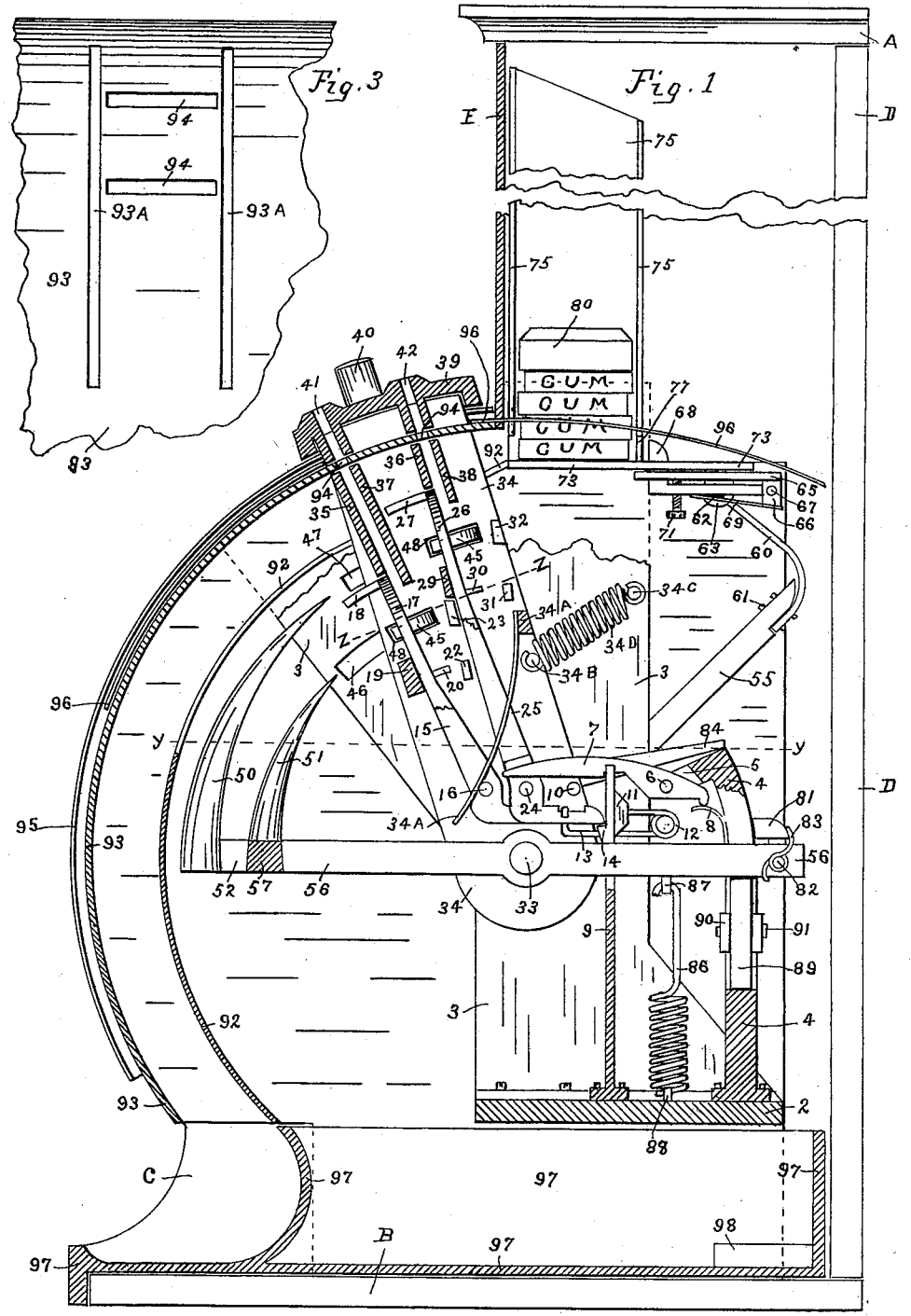
Figure 2:
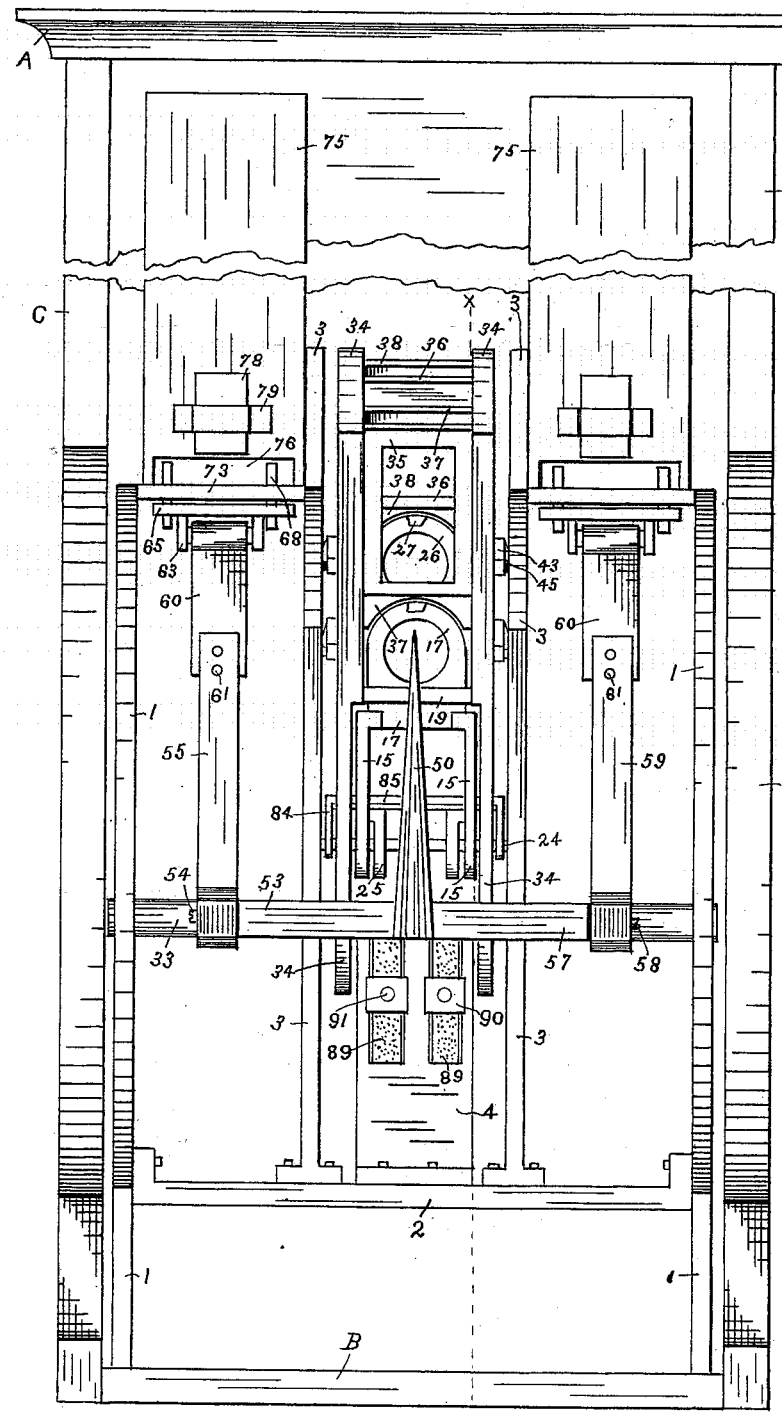
Figure 4:
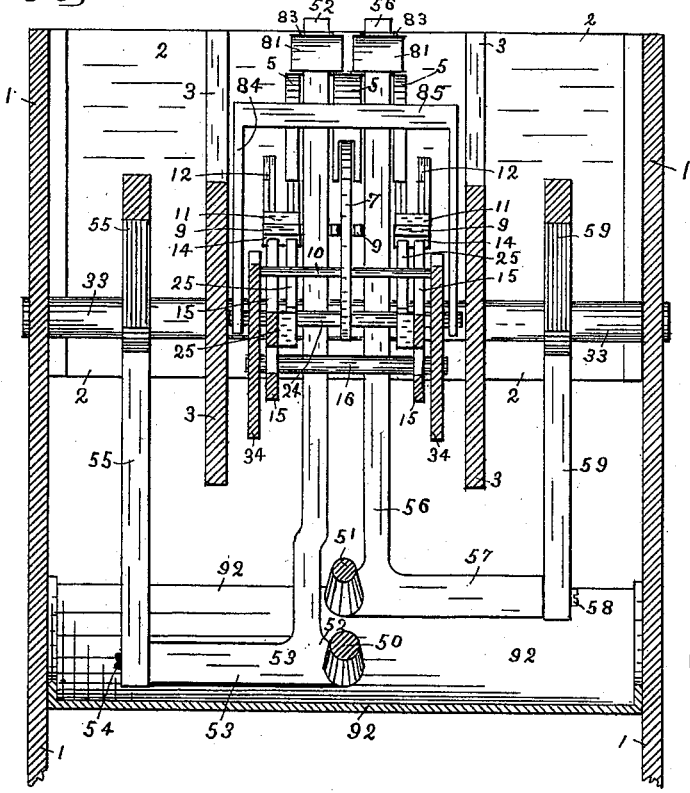
Figure 10:
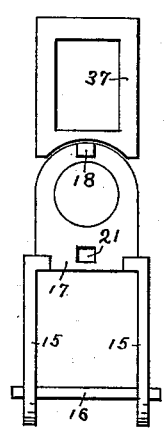
Figure 11:
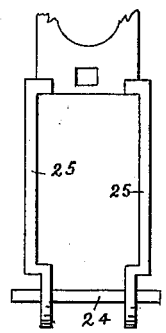
Figure 5:
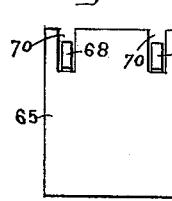
Figures 6, 7:
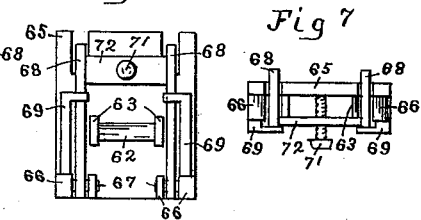
Figure 12:
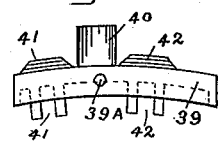
Figures 8, 9:
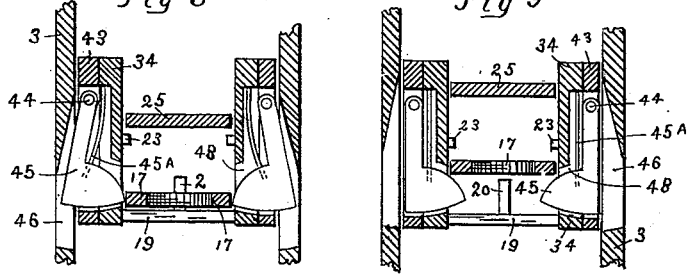
Figure 13:
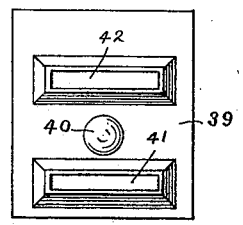

Figure 1 is a perpendicular longitudinal section showing those parts of the machine which are at the left of the line $xx$ drawn on Fig. 2. Fig. 2 is a front elevation of the machine, the outer curved front, the curved guide, and the top or cap of the operating-lever removed. Fig. 3 indicates the upper part of the curved front, the grooved guide having been removed. Fig. 4 is a sectional plan drawn through line $yy$ on Fig. 1. Fig. 5 indicates the top of the ejector. Fig. 6 indicates the bottom of the ejector. Fig. 7 is a front view of the ejector. Fig. 8 is a cross-section of the operating-lever through lines $zz$ drawn on Fig. 1. Fig. 9 is a different view of the same cross-section. Fig. 10 is a front view of the coin-placer and locking-plate. Fig. 11 is a front view of the second coin-placer, the upper part having been removed. Fig. 12 is a side elevation of the top of the operating-lever. Fig. 13 is a plan of the same. Fig. 14 is a front elevation of my machine. Fig. 15 is a side elevation of the auxiliary frame. Fig. 16 is a front view of the same. Fig. 17 is a side elevation of the tripping-spring. Fig. 18 is a front elevation of the same. Fig. 19 indicates the floor of the merchandise-containing column. Fig. 20 is a top view of the slot-shield.

Similar letters and numerals refer to similar parts throughout the several views.

The two perpendicular plates 1, (see Fig. 2,) the cross supporting-frame 2, secured thereto, the two perpendicular locking-plates 3, secured to the upper surface of the cross-support 2, and the auxiliary frame 4, likewise secured, constitute the framework of my machine. The main shaft 33, suitably mounted in the perpendicular members of the frame and extending laterally across the machine, supports the principal operating mechanism thereof.

The operating-lever or prime mover consists of the two perpendicular side plates 34, (see Figs. 1 and 2,) supported in suitable bearings upon the main shaft 33 and rigidly secured one to the other by the several cross members referred to hereinafter. The intervening space between the two side plates 34 above the adjusting-stops 20 and 30 is slightly greater than the diameter of the coin intended to be used, thus allowing the said coin to fall with as little side play as possible. Below the stops 20 and 30 this space is increased to permit the arms of the coin-placers 15 and 25 to be separated sufficiently to allow the coin used to fall unobstructed into the cash-box. The two side plates 34 are connected by the two cross guide-plates 35 and 36, the two locking-plates 37 and 38, the two cross-stays 19 and 29, and the two shafts 16 and 24, the space intervening between plates 35 37 and 36 38 forming guideways for the coins inserted.

Fixed securely to the inner surface of each side plate 34 are the two pressure-studs 23 and 32, (see Figs. 1, 8, and 9,) each relatively placed with its mate on the opposite plate and projecting inwardly to receive the edge of and hold the coin pressed against them by the coin-placer, in which position the coin is brought into contact with the curved arm of the ejecting-lever, thus actuating the said lever. The four adjusting-lugs, two 22 and two 31, (see Fig. 1,) are secured to the side plates 34 and adjusted to strike the upright arms of and arrest the backward throw of the coin-placers in such position as will allow them to hold the coin against the pressure-studs, and also thereby securing means whereby a coin or other article thinner than the coin intended to be used in the machine will not be so held, but will be dropped before contact can be had with the ejecting-levers.

Pivoted one upon shaft 16 and one upon shaft 24 are the two coin-placers 15 and 25, (see Figs. 1, 10, and 11,) the inner or rear placer 25 having its length extended beyond that of the outer placer 15 equal to two-thirds of the diameter of the coin used in the machine, each of the said coin-placers consisting of two angular levers. To the upper ends of each pair of said levers is secured a circular head ringed face-plate, the arc of the outer circle being exactly that of the coin intended to be used in the machine. To the top of the circular heads and extending backward from the face are secured the coin-stops 18 and 27, and near the bottom of each head-plate is a slot, (see 21, Fig. 10,) through which extend the coin-adjusting stops 20 and 30. (See Fig. 1.) The upper or long arms of the coin-placer 15 are straight. The similar arms of the coin-placer 25 (see Fig. 11) are near their pivots carried inward and downward in order to bring their shorter or horizontal arms on a level with the similar arms of coin-placer 15, the said short arms extending backward and having near their outer ends slots provided to receive and retain hooked ends 13 of the tripping-spring 12.

To the two cross-stays 19 and 29 (see Fig. 1) are secured their respective coin-adjusting stops 20 and 30 and so adjusted that they stop and support the coin in such a position that its upper edge will be on a line with the circular head of the coin-placers.

Near the upper ends of the side plates 34 are secured guide-plates 35 and 36, (see Figs. 1 and 2,) each extending downward to near the top of their respective coin-placers, their inner surfaces being on a line with the face-plate of said coin-placers, and immediately behind each of these two plates—namely, 35 and 36—and leaving clear a guideway of sufficient depth to allow the free passage of the coin are placed locking-plates 37 and 38, (see 37, Fig. 10,) their lower portion being curved to form a close rubbing contact with the circular heads of their respective coin-placers. In each of the said plates 34 and on a line with the centers of each circular head of the coin-placers slots 48 are provided, (see Figs. 1, 8, and 9,) through which locking-pawls 45 project inwardly, forming contact with the said circular heads. To the outside of the perpendicular sides 34 and alined with the slots 48, just described, are secured slotted pawl-carriers 43, and pivoted therein by pivots 44 are the locking-pawls 45, which are normally held pressed inward by spring 45$^A$.

In each of the two locking-frames 3 (see Fig. 1) slots 46 and 47 are provided, into which the locking-pawls 45 project and effectually lock the operating-lever, thereby preventing the machine from being operated in certain events, which will be referred to hereinafter.

The guide-plate 34$^A$, provided with lateral flanges near its upper end and secured to the inner surface of each of the perpendicular sides 34, operates to guide the released coin into the cash-box.

10 indicates a cross-shaft or releasing-bar secured to the two side plates 34 and so placed as to release the pawl 7 at a predetermined time—namely, immediately following the tripping of the coin-placers. The two perpendicular sides 34 extend upward through slots 93$^A$ in the curved front 93 (see Fig. 3) and through opening 96$^A$ in the slot-shield 96, Fig. 20, to the outside of the curved front, where the removable top or cap 39 is secured thereto by screws 39$^A$, the said top or cap consisting of a slotted top plate having downwardly-projecting sides and ends, which fit over the outwardly-projecting ends of the perpendicular sides 34, the pull-lug 40 being secured to the top plate. The two coin-receiving slots 41 and 42 correspond with the similar slots 94 in the curved front 93 and also with the guideways or passages formed between the plates 35 37 and 36 38.

34$^D$ indicates a spiral spring (see Fig. 1) anchored to cross-bar 34$^C$, which is secured to the two locking-frames 3, the opposite end of the spring being attached to the cross-bar 34$^B$, the said bar secured to the side plates 34 of the operating-lever, the spring exerting its strain to retain the operating-lever in its normal or upright position.

Securely fixed to the upper surface of the cross supporting-frame 2, Figs. 1, 17, and 18, is a vertical tripping spring-plate 9, preferably made of spring brass or steel and so set as to exert an inward pressure from the top, thus allowing the top of the said plate 9 to spring inwardly when released from the pawl 7. In the center of the top of plate 9 slot 9$^B$ is provided, in which operates the pawl 7, and near the top of said plate 9 and extending downward are the two slots 9$^A$, through which extend the rear arms of the ejecting-levers 52 and 56, and on a line with the horizontal arms of the coin-placers 15 and 25 is foot-rest 14, provided to engage with the said arms of the coin-placers to return and retain them in their normal position. The action is as follows: Upon depressing the operating-lever the arms of the coin-placers are pulled off the foot-rest 14, allowing the spring 12 to press the said arms downwardly, thus throwing the circular heads of the said coin-placers rearwardly. At the same time pawl 7 is released from its connection with the tripping-plate 9 by the releasing-shaft 10, which allows the said plate 9 to spring forward or inwardly to a position that will insure contact between the arms 15 and 25 and foot-rest 14 upon the return of the operating-lever, thereby returning the coin-placers to their normal position.

4 (see Figs. 1, 15, and 16) indicates an auxiliary frame secured to the rear upper surface of the cross supporting-frame 2, and having provided therein two vertical slots 4$^A$, through which extend the rear arms of the two ejecting-levers, the upper portion of the said frame 4 being curved, the curve springing from a point on a line with the main shaft 33 and conforming to the arc of a circle, the radius of the same being from the center of the main shaft 33 to the outer surface of said frame 4, the top of the said frame extending inwardly and downwardly to form a bearing for pawl 7 and providing a seat for the reciprocating push-rod 85. (See Fig. 4.)

The central member of the projecting top 5 (see Figs. 1 and 16) has its forward end slotted to form a seat for the pivot for pawl 7, and immediately under this slot and secured to the body of frame 4 is secured the spring 8, provided to retain the pawl 7 in its normal position, the forward end of the said pawl extending inwardly over the tripping spring-plate 9, which it engages to hold it back and retain it in a vertical position until released by releasing-shaft 10, the inner end of pawl 7 being further extended to ride over the releasing-shaft 10.

Secured within each of the slots 4ᴬ and below the arms of the ejecting-levers are rubber cushions 89, held in place by cleats 90, coupled together by screws 91, screwing through the cleats and the cushions, the said cushions being provided to receive and break the rebound of the ejecting-levers.

The cross-shaft 24 (see Figs. 2 and 4) extends slightly beyond the perpendicular sides 34 of the operating-lever, forming pivots for the arms 84 of the reciprocating pusher 85, the said pusher operating to disengage the pawl 81 from its engagement at the top of frame 4.

In the attached drawings, forming a part of this specification, I show the ejecting-levers (see Fig. 4) one operating to the right and the other to the left of the operating-lever, the ejecting-lever 52, operating to the left, being extended in length beyond that of lever 56 to allow the curved pointed arm 50 to clear the top of the coin-placer 15 and center the circular head of coin-placer 25. With this exception the levers and their attached members are similarly constructed. Therefore a description of one will suffice. The ejecting-lever operating the ejector at the right of the machine (see Figs. 1, 2, and 4) consists of a lever 56, mounted upon the main shaft 33 and having at its outer end a connecting cross-arm 57, to the inner end of which is secured a curved pointed arm 51, extending upward, its curvature conforming to the arc of a circle, the radius being from the center of the main shaft 33 to the center of the circular head of the coin-placer 15. To the opposite end of the cross-arm 57 is secured the outer arm of the auxiliary lever 59, pivoted upon the main shaft 33, its bearing being vertically alined with the center of the merchandise-containing column and its rear arm extending upward and backward from its bearing at an angle of about forty-five degrees, the said rear arm being connected with the ejector through spring 60. I herein provide means to eject the merchandise, the action being as follows: The coin held in position in the operating-lever coming in contact with the point of the curved arm 51 carries down with it the forward arm of the lever 56, and through cross-arm 57 the same motion is conveyed to the auxiliary lever 59, this action elevating the rear arms of the two levers, thereby through spring 60 actuating the ejector to throw out the merchandise and at the same time elevating the pawl 81 to engage with the the top of the auxiliary frame 4 to hold and retain lever 56, with its connected parts, out of action until the operating-lever has been allowed to return to its normal position, when pawl 81 is released by push 85, allowing spring 86 to return the lever 56, with its connections, to their normal positions, the pawl 81 being so adjusted that it will be raised above the top of frame 4 immediately before the ejector throws out the merchandise, thus preventing operating the machine more than once with the same coin. The rear arm of the lever 56, extending back through slots in the tripping spring-plate 9 and auxiliary frame 4, has its rear end slotted to provide bearings for the pawl 81, the upper portion of which pawl is widened to span the slot over which it operates and is normally held pressed inward by the spring 83. The action of pawl 81 is fully described in the preceding paragraph.

Spiral spring 86, anchored to stud 88 in the cross-frame 2 and attached to the lever-arm 56, operates to give the required pressure to the curved point 51 and also to return the ejecting-lever, with its attached mechanism, to their normal positions.

75 indicates a merchandise-containing column, its center being placed slightly to the rear of the main shaft 33 and securely fixed to the tops of the vertical frames 1 and 3. (See Figs. 1 and 2.) An opening 76 is provided in the lower portion of the front wall for the expulsion of the merchandise contained therein, which opening is made adjustable as to depth by means of a sliding door 78, operating in the slideway 79, secured to the front of the column 75, thus providing means in connection with the adjustable pawls of the ejector whereby the number of pieces or quantity of merchandise ejected may be easily and quickly regulated. Slots 77 (see Fig. 1) are provided in the rear wall of the said column for the passage of the ejector-pawls.

73 (see Figs. 1, 2, and 19) indicates the floor of the column 75, having provided therein slots 74, through which ejecting-pawls 68 extend upward and travel longitudinally.

65 (see Figs. 1, 5, 6, and 7) indicates the top or sliding plate of the merchandise-ejector, having provided in its forward end two slots 70, through which the pawls extend upward, and to the rear end of this plate and to the under surface thereof are secured bearing-blocks 66, to which the ejecting-pawls 68 are pivoted, the said pawls being secured one to the other by cross-plate 72, through which plate operates the adjusting-screw 71, its upper end pressing against the under surface of plate 65, and by operating the said screw the ejecting-pawls are raised or lowered and retained in such position, thereby adjusting the said pawls to eject a given quantity of merchandise at each operation. A spring 69 is anchored to each of the bearing-blocks 66, the forward ends being turned inward to overlap and press upward the said pawls 68. Bearings 63 are also secured to the under surface of the plate 65, to which is pivoted the supporting-spring 60 by pin 62, the opposite end of this spring being secured to the upper end of the auxiliary lever 55, exerting an upward strain, thereby retaining the ejector in its normal position.

92 (see Fig. 1) indicates a curved guide or slide way secured to the framework of the machine and extending downward to the top of the cash-box 97, the upper central portion being removed for the passage of the operating-lever, the remaining upper portion extending upward on either side of the said operating-lever to the under surface of the floor-plates 73, where they are secured, the merchandise ejected sliding over this guide and falling into the receiving-trough provided at the forward end of the cash-box 97.

The front wall or curved front of the machine (see Figs. 1 and 14) consists of a curved metal plate or casting 93, secured to the framework and slotted, as shown in Fig. 3. The perpendicular slots 93$^A$ therein shown are provided for the upper ends of the perpendicular sides 34 of the operating-lever and extend downward from the top for a distance equal to the drop of the said lever, the two transverse slots 94 being provided for the passage therethrough of the coins inserted. To the outer surface of the curved front 93 and alined with the slots 93$^A$ are the grooved guides 95, fixed to the said curved front, these guides being provided to receive, retain in position, and guide the slot-shield 96, the said slot-shield (see Figs. 1, 14, and 20) consisting of a strip of spring metal and having near its center an opening 96$^A$, which opening fits over and engages with the upper end of the operating-lever, the said shield extending front and back of the said lever a sufficient distance to cover the slots 93$^A$ in the curved front 93, it being understood that the shield 96 travels with the operating-lever and is provided to keep the slots 93$^A$ covered at all times irrespective of the position of the operating-lever.

In all machines of this character it is desirable and necessary to provide means whereby pilfering therefrom may be prevented. In this instance I secure such means by causing the operating-lever to automatically lock itself in a certain class of such attempts—namely, all those in which metal strips or strips of other material or coins with strings attached are used—the locking being accomplished in the following manner: The locking-pawls 45 (see Figs. 1, 8, 9, and 10) are normally held pressed outward in their locking position by the circular heads of the coin-placers, (see Fig. 8,) and any article placed in the slot and allowed to project above the circular head of either coin-placer prevents the said placer from passing under the locking-plates 37 and 38, thus retaining the pawls 45 pressed outward, as their connection with the said placer is not severed until such passage has been accomplished. The attempts at pilfering where the article used allows the coin-placers to clear the locking-plates are provided against in the following manner: The adjusting-stops 22 31 allow the coin-placers to approach the pressure-studs 23 32 no nearer than is necessary to hold the coin intended to be used in the machine. If the article used is thinner, it falls, and if smaller it either falls or fails to make contact with the pressure-studs and is thrown to the rear of the box.

While I have shown only a two-slot machine, it is obvious that a much larger machine could be made by arranging together two or more of the machines here shown.

The cash-box 97 (see Fig. 1) consists of a drawer the front end of which forms a trough to receive the merchandise ejected, a lock 98 being also provided.

The outer walls inclosing the mechanism and herein indicated by the letters A B C D may be made of any suitable material and of any pleasing design.

I claim as my invention—

1. In a vending-machine, the coin-receiving operating-lever, composed of the two perpendicular side plates 34, mounted upon the main shaft 33, the two guide-plates 35 36, the two locking-plates 37 and 38, secured to the side plates 34, the two coin-placers 15 and 25, having circular, ringed heads, and pivoted to side plates 34, the two cross-stays 19 29, secured to the side plates 34, the two coin-adjusting stops 20 30 secured to cross-stays 19 29, the four locking-pawls 45 secured to frame 34, the two adjusting-lugs 22, the two adjusting-lugs 31, the two pressure-studs 23, the two pressure-studs 32, all secured to the frame 34, the guide-plate 34$^A$, the removable cap 39, having coin-slots and pull, the releasing-shaft 10, the pawl 7, the tripping-plate 9, the reciprocating push 85, the pawl 81, substantially as and for the purpose hereinbefore set forth.

2. In a vending-machine, the tripping-plate 9, having slots 9$^A$ and 9$^B$ and having secured thereto the spring 12 and foot-rest 14, substantially as and for the purpose hereinbefore set forth.

3. In a vending-machine, the ejecting-lever composed of the main lever mounted upon the main shaft, the cross connecting-arms, secured to the main lever, the curved pointed arm fixed to the cross-arm, the auxiliary lever mounted upon the main shaft, and connected to the cross-arm, substantially as and for the purpose hereinbefore set forth.

4. In a vending-machine the ejector, composed of the sliding plate, the spring journaled thereto, the spring-pressed pawls pivoted to the sliding plate and connected by the cross-plate, the adjusting-screw operating through the cross-plate, substantially as and for the purpose hereinbefore set forth.

5. In a vending-machine, the combination with the main frame, with the operating-levers, and with the ejecting-levers, of the auxiliary frame 4 having the curved projecting top, and two vertical slots with the middle projecting top piece slotted for a pawl-bearing, of pawl 7 pivoted therein substantially as and for the purpose hereinbefore set forth.

6. In a vending-machine, the combination with the main frame, with the auxiliary frame, and with the ejector-lever, of the rubber cushions secured to the auxiliary frame substantially as and for the purpose hereinbefore set forth.

7. In a vending-machine the combination with the main frame, with the operating-lever, with the coin-placers, with the releasing-shaft 10, and with pawl 7, of the tripping spring-plate 9; substantially as and for the purpose hereinbefore set forth.

FRANK P. KEESEE.

Witnesses:
INA McCRIMMON,
W. J. McCRIMMON.